US012624959B2

(12) United States Patent
Hada

(10) Patent No.: US 12,624,959 B2
(45) Date of Patent: May 12, 2026

(54) SYSTEMS AND METHODS FOR MULTI-ELEVATION FOOT TRAFFIC SCANNING

(71) Applicant: TOYOTA MOTOR ENGINEERING & MANUFACTURING NORTH AMERICA, INC., Plano, TX (US)

(72) Inventor: Hideki Hada, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 17/750,117

(22) Filed: May 20, 2022

(65) Prior Publication Data

US 2022/0397416 A1 Dec. 15, 2022

Related U.S. Application Data

(60) Provisional application No. 63/209,160, filed on Jun. 10, 2021.

(51) Int. Cl.
*G01C 21/00* (2006.01)
*G06V 20/58* (2022.01)
*G01S 7/481* (2006.01)

(52) U.S. Cl.
CPC ..... *G01C 21/3807* (2020.08); *G01C 21/3804* (2020.08); *G06V 20/58* (2022.01); *G01S 7/481* (2013.01)

(58) Field of Classification Search
CPC ................ G01C 21/3807; G01C 21/20; G01C 21/3804; G01S 7/481; G06V 20/58; H04N 7/181
See application file for complete search history.

(56) References Cited

U.S. PATENT DOCUMENTS 6,123,306 A 9/2000 Jackson
9,205,835 B2 12/2015 Stein
(Continued)

FOREIGN PATENT DOCUMENTS

EP 1356963 A1 10/2003
GB 2323930 10/1998
WO 2006026354 A2 3/2006

OTHER PUBLICATIONS

Konttila et al., "Portable Computer-Vision Rack for Electrode Detection," 5th European Conference of the International Federation of Medical and Biological Engineering, IFMBE Proceedings, Jan. 2012, 37:65-168 (https://doi.org/10.1007/978-3-642-23508-5_44).

(Continued)

*Primary Examiner* — Keith D Bloomquist
(74) *Attorney, Agent, or Firm* — SHEPPARD, MULLIN, RICHTER & HAMPTON LLP; Daniel N. Yannuzzi

(57) ABSTRACT
Systems and methods are provided for obtaining characterizations of paths to be traversed, such as foot paths. A scanning tool may be configured to capture information or data characterizing aspects of such a path. The scanning tool may comprise multiple sensors for capturing image/visual data from multiple perspectives, as well as for capturing data reflecting physical features or conditions of the path. Such information can be combined and quantified or otherwise characterized to provide insight into micromobility zones.

19 Claims, 13 Drawing Sheets

(56) References Cited

U.S. PATENT DOCUMENTS

| | | | | |
|---|---|---|---|---|
| 10,303,958 | B2 | 5/2019 | Springer | |
| 10,430,939 | B1 * | 10/2019 | Levin ..................... | G02B 27/62 |
| 2009/0006007 | A1 * | 1/2009 | Greiner ................ | G01M 17/02 |
| | | | | 702/44 |
| 2015/0198440 | A1 * | 7/2015 | Pearlman ............... | G01S 17/86 |
| | | | | 356/4.01 |
| 2017/0203446 | A1 * | 7/2017 | Dooley ............... | H04N 23/631 |
| 2019/0172252 | A1 * | 6/2019 | Stokking ............. | G02B 27/017 |
| 2019/0204089 | A1 * | 7/2019 | Rochan Meganathan ................... | |
| | | | | G01S 13/89 |
| 2019/0371171 | A1 * | 12/2019 | Sholingar ............... | B60Q 1/32 |
| 2020/0283091 | A1 * | 9/2020 | Hiramatsu .............. | B62K 5/08 |
| 2021/0310813 | A1 * | 10/2021 | Oh ........................ | H04W 4/029 |
| 2022/0099831 | A1 * | 3/2022 | Ramanath ............ | G05D 1/0255 |
| 2023/0230033 | A1 * | 7/2023 | Hagen ................. | H04N 23/651 |
| | | | | 705/28 |

OTHER PUBLICATIONS

Wikipedia, "Camera Dolly," 4 pages (https://en.wikipedia.org/wiki/Camera_dolly).

* cited by examiner

300B

308

308A

304

302

300A

306

304

308A

308

302

RECEIVE DATA REGARDING SCANNED PATH — 610

COMBINE RECEIVED DATA TO GENERATE MAP OF THE SCANNED PATH — 612

CHARACTERIZE ASPECTS OF THE SCANNED PATH — 614

FIG. 7

SYSTEMS AND METHODS FOR MULTI-ELEVATION FOOT TRAFFIC SCANNING

CROSS REFERENCE TO RELATED APPLICATIONS

This non-provisional patent application claims priority to U.S. Patent Application No. 63/209,160, filed on Jun. 10, 2021, the contents of which is incorporated herein by reference in its entirety.

TECHNICAL FIELD

The present disclosure relates generally to scanning technologies, and more particularly, the present disclosure relates to devices enabling scanning of foot paths from differing heights at the same time, where upon combining the different scans, mobility challenges for those with mobility difficulties can be better understood or addressed.

DESCRIPTION OF RELATED ART

Sensors such as Light Detection and Ranging (LiDAR) sensors may be used to measure the distance, e.g., from a vehicle, to an obstacle in the vehicle's vicinity. A LiDAR sensor measures distance to a peripheral object using laser light such as infrared rays. For example, a LiDAR sensor scans infrared laser light three-dimensionally (in the horizontal and vertical directions) to obtain three-dimensional (3D) point cloud data of the vicinity of the vehicle.

Cameras may also be used to capture images of an area(s) surrounding a vehicle. An image captured by the camera can be analyzed with a deep learning technique such as SSD (Single Shot Multibox Detector), for example, so that attributes of various objects (vehicles, passengers, structures, etc.) included in the image can be recognized.

By combining the 3D point cloud data obtained by the LiDAR sensor with the image recognition achieved by the camera, it becomes possible to determine the distance of objects from, in this case, the vehicle, and attributes of those objects.

BRIEF SUMMARY OF THE DISCLOSURE

In accordance with one embodiment, an apparatus, comprises a frame, and a mobility mechanism operatively connected to the frame, The apparatus further comprises a first set of sensors operatively connected to the frame capturing different perspective views of a scene including a pathway, a second set of sensors operatively connected to the frame capturing physical measurements characterizing the pathway based on the mobility mechanism traversing the pathway.

In some embodiments, the first set of sensors comprises imaging sensors.

In some embodiments, the frame comprises a vertical structure and a horizontal structure moveably connected to the vertical structure.

In some embodiments, the first set of sensors are operatively connected to the vertical structure at different heights along the vertical structure.

In some embodiments, the second set of sensors are operatively connected to the horizontal structure.

In some embodiments, a first sensor of the second set of sensors comprises an angle sensor adapted to measure an angle of deviation from a level surface of the pathway.

In some embodiments, the angle sensor is disposed approximately at a point where the vertical structure and the horizontal structure are moveably connected.

In some embodiments, second and third sensors of the second set of sensors comprises torque sensors further operatively connected to the mobility mechanism.

In some embodiments, the torque sensor measures resistance experienced by the mobility mechanism when traversing the pathway.

In some embodiments, the apparatus further comprises a communications unit through which the perspective views and the physical measurements are transmitted to a remote path analysis server generating a map of the pathway by combining the perspective views and the physical measurements.

In accordance with one embodiment, a method comprises: receiving data regarding a scanned path from a scanning tool traversing the scanned path; combining the received data to generate a map of the scanned path; and characterizing aspects of the scanned path based on the combined received data.

In some embodiments, receiving the data regarding the scanned path comprises receiving sensor data from a first set of sensors disposed on a scanning tool, each of the first set of sensors comprising imaging devices disposed at varying heights along the scanning tool.

In some embodiments, receiving the data regarding the scanned path comprises receiving sensor data from a second set of sensors disposed on the scanning tool, the second set of sensors comprising an angle sensor and a torque sensor.

In some embodiments, the method further comprises determining at least one of a time and location associated with the received data.

In some embodiments, characterizing aspects of the scanned path comprises assigning a value quantifying the aspects of the scanned path based on physical features of the scanned path.

In some embodiments, characterizing aspects of the scanned path comprises assigning a value quantifying the aspects of the scanned path based on an amount of torque needed to overcome a physical feature of the scanned path.

In some embodiments, characterizing aspects of the scanned path comprises assigning a value quantifying the aspects of the scanned path based on an angle of deviation of a physical feature of the scanned path relative to a level section of the scanned path.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 7:
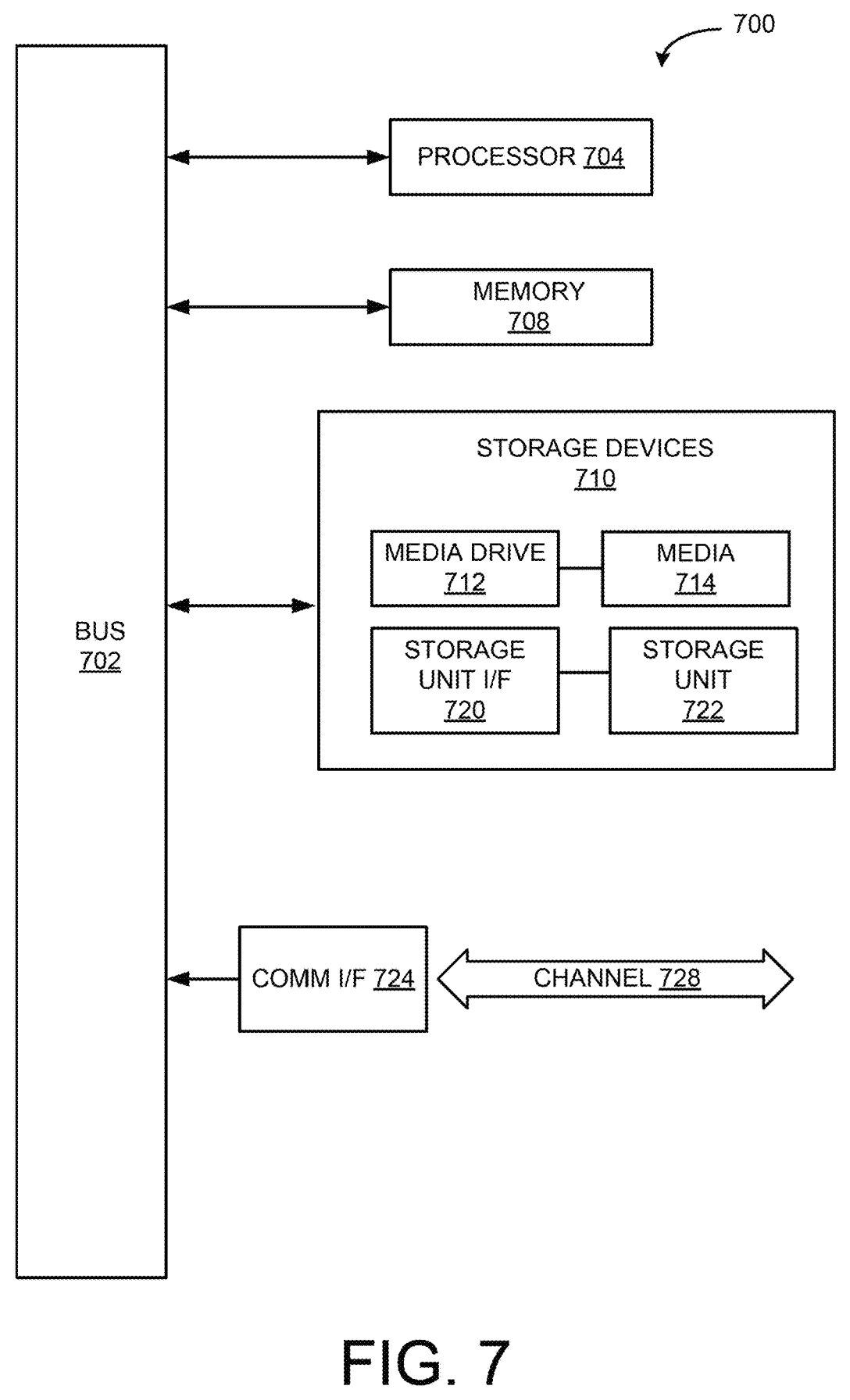

FIG. 7 is an example computing component that may be used to implement various features of embodiments described in the present disclosure.

Figures 1A, 1B:
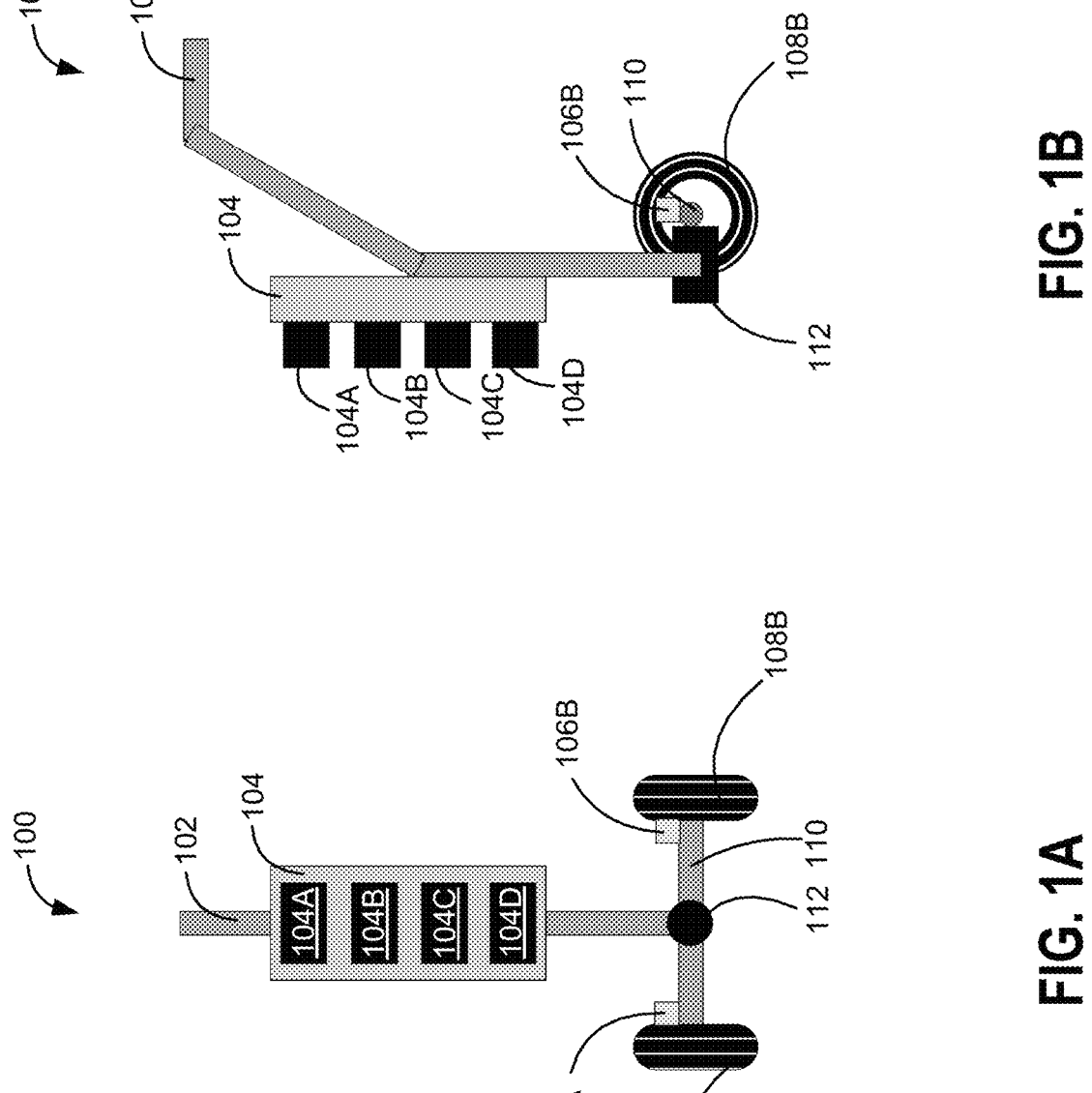
FIG. 1A is a front view of an example scanning tool in accordance with some embodiments.
FIG. 1B is a side view of the example scanning tool of FIG. 1A.

The figures are not exhaustive and do not limit the present disclosure to the precise form disclosed.

DETAILED DESCRIPTION

As alluded to above, scanning technologies and devices are available to glean certain information regarding an obstacle(s) or object(s) in the vicinity of such devices. Conventional use of such scanning technologies and devices is limited to vehicle-based scanning or tripod-based scanning. For example, scanning technology may be used on automated vehicles (as noted above) to create 3D scanned images of roads (for purposes of assisting automated vehicles in traversing roadways/navigating obstacles), or may be used by architects when designing buildings. However, such uses/implementations cannot accommodate scanning/measuring foot paths. Traversing foot paths/traversing paths by foot can result in encountering various mobility hazards, e.g., gaps, slopes, or other irregularities that could trip a pedestrian, impede progress of a wheelchair used by a person with mobility challenges, etc.

Accordingly, various embodiments are directed to a wheeled or other mobile scanning tool or device with which various images and information regarding surfaces/areas of foot traffic may be captured. Such a scanning device can include sensors attached to wheels (or other mobility mechanisms, such as spheres, tracks, etc.), such as torque sensors, for measuring the unevenness of surfaces, as well as the torque necessary to propel, e.g., a wheelchair up/over/past/ the surfaces or areas of foot traffic. The scanning device may include sensors, such as angle sensors that can be used to measure elevation changes/lateral slope of the surfaces/areas of foot traffic. The scanning device may comprise multiple mounting options and locations for cameras, LiDAR, or similar sensors to facilitate capturing images/information regarding the surfaces/areas of foot traffic from varying heights to accommodate the different perspectives of pedestrians or mobility challenged persons.

Further still, the scanning device may comprise a software component(s) for combining respective sensor outputs/images so that the captured information from different perspectives can be synchronized or normalized. For example, in some embodiments, difference perspective views, e.g., associated with a standing adult, a sitting adult in a wheelchair, a standing child, a child riding a bicycle, etc., can be combined to mitigate the impact of occluded views, or unseen foot path characteristics. That is, a child may not see one or more features or characteristics of a path the child is traversing given their stature, while an adult may be able to appreciate such features/characteristics. Accordingly, a combined view/map can present as much information or data as possible regarding a foot path to a user/person.

It should be understood that as used herein, the term "foot paths" can refer generally to any areas, the traversal of which may result in encountering obstacles or may have characteristics that may not necessarily be determinable via vehicular or "taller" scanners. Such paths or areas need not be limited to traversal by foot or by walking only.

Once images/information regarding the surfaces or areas of foot traffic have been captured (and synchronized or normalized as may be needed), the images/information can be analyzed to identify or characterize mobility features of interest, e.g., potential mobility hazards (gaps, slopes, surface irregularities, etc.). Additionally, in some embodiments, the kind/amount of effort a subject, such as a pedestrian, may need to exert in order to traverse a foot path (or portions thereof) may be quantified and presented to such subjects. These subjects may have varying degrees or types of mobility challenges due to, e.g., height, vision, use of a mobility assistance device, etc. For example, a child may have difficulty traversing a high step or curb, which may also present mobility challenges for a subject in a wheelchair or that relies on some form of mobility assistance device.

As alluded to above, a scanning tool as contemplated herein, enables individuals or other interested entities to capture three dimensional (3D) images of foot paths (driveway, sidewalk, parking, etc.) at different heights (standing adult, adult on a wheelchair, standing child, and dog) at the same time. Combined images enable users or interested parties to detect and understand mobility challenges for people with mobility difficulties, and thus helps engineers develop more appropriate devices to support those people, or design better foot paths for easier traversal.

FIGS. 1A and 1B illustrate respective front and side views of an example scanning tool 100. Scanning tool 100 may comprise a frame or structure adapted to hold or onto which one or more sensing components or elements may be implemented. In some embodiments, scanning tool 100 may include a first, vertical structure 102 on or in which attachment points or receivers/receptacles for sensing components are disposed. Example attachment points 104A-D may be any form or type of attachment point, and may be disposed on an attachment structure 104. In some embodiments, attachment structure 104 may comprise a physical housing or frame within which electrical/circuit-based systems are housed for operative interaction with one or more sensors attached thereto. For example, attachment structure 104 may house a processor, memory unit, communications (e.g., wireless) mechanism(s), power supply source, such as a battery, etc. (not shown in FIGS. 1A, 1B).

In some embodiments attachment points 104A-D may be electrical/electronic-based attachment points, such as communication or data ports, e.g., Universal Serial Bus (USB)-type ports. In some embodiments, attachment points 104A-D may comprise a connection to a power source or power delivery mechanism. In some embodiments, attachment points 104A-D may comprise both power delivery and data transfer capabilities. Attachment points 104A-104D may further comprise structural or physical connection or retention mechanisms (clips, friction-fit apertures, etc.) adapted to maintain an attached sensor in position, e.g., relative to vertical structure 102/*a* foot path surface(s) being scanned. In some embodiments, the type/style of each or some subset of attachment points 104A-D may differ. Those of ordinary skill in the art will understand that any type of suitable attachment point may be embodied by one or more of attachment points 104A-D. It should be understood that the arrangement of attachment points 104A-D illustrated in FIGS. 1A-1B is merely one contemplated example, and other configurations of attachment points (and sensors attached thereto) can vary in accordance with other embodiments.

Sensors (not shown in FIGS. 1A-1B) that may attach to one or more of attachment points 104A-D may monitor/ sense conditions, e.g., sonar, radar, lidar or other proximity sensors, cameras or other image sensors, etc. As will be described in greater detail below, such sensors can be used to detect, for example, characteristics of a foot path, foot path surface(s) curvature, obstacles in/on the foot path, and so on. Still other sensors may include those that can detect surface grade. While some sensors can be used to actively detect passive environmental objects, other sensors can be included and used to detect active objects such as those objects used to implement smart roadways or pathways that may actively transmit and/or receive data or other information.

Scanning tool 100 may further comprise a second, horizontal structure 110, on which one or more wheels (108A, B) and one or more other sensors (106A, B) may be disposed. It should be understood that although some embodiments comprise a vertical structure 102 and a horizontal structure 110, scanning tool 100 may be configured in contemplated, alternative ways, e.g., scanning tool 100 may comprise multiple vertical structures to accommodate additional sensors. The orientation of vertical structure 102 relative to horizontal structure 110 may vary. Scanning tool 100 may have other contemplated structures for supporting sensors and scanning foot paths. For example, instead of distinct vertical and horizontal structures, scanning tool may comprise a singular structure to which wheels or other motive mechanism(s) may be attached.

As illustrated in FIG. 1A, horizontal structure 110 and vertical structure 102 may be operatively connected at a connection point commensurate with the location of an angle sensor 112. Moreover, proximate to each of wheels 108A and 108B, scanning tool 100 may further comprise respective wheel sensors 106A and 106B. As illustrated by FIG. 1B, a portion of vertical structure 102 may comprise a handle or portion with which a user may push, pull, or otherwise move scanning tool 100 to traverse a foot path for scanning. In some embodiments, scanning tool 100 may be automated or remotely controlled to traverse a foot path(s) for scanning. Accordingly, in some embodiments, scanning tool 100 may comprise a processor or control unit (not shown in FIGS. 1A, 1B) for receiving instructions, transmitting commands, etc. to effectuate traversal over a foot path, as well as the gathering of information or data characterizing the foot path being scanned.

Figure 2:
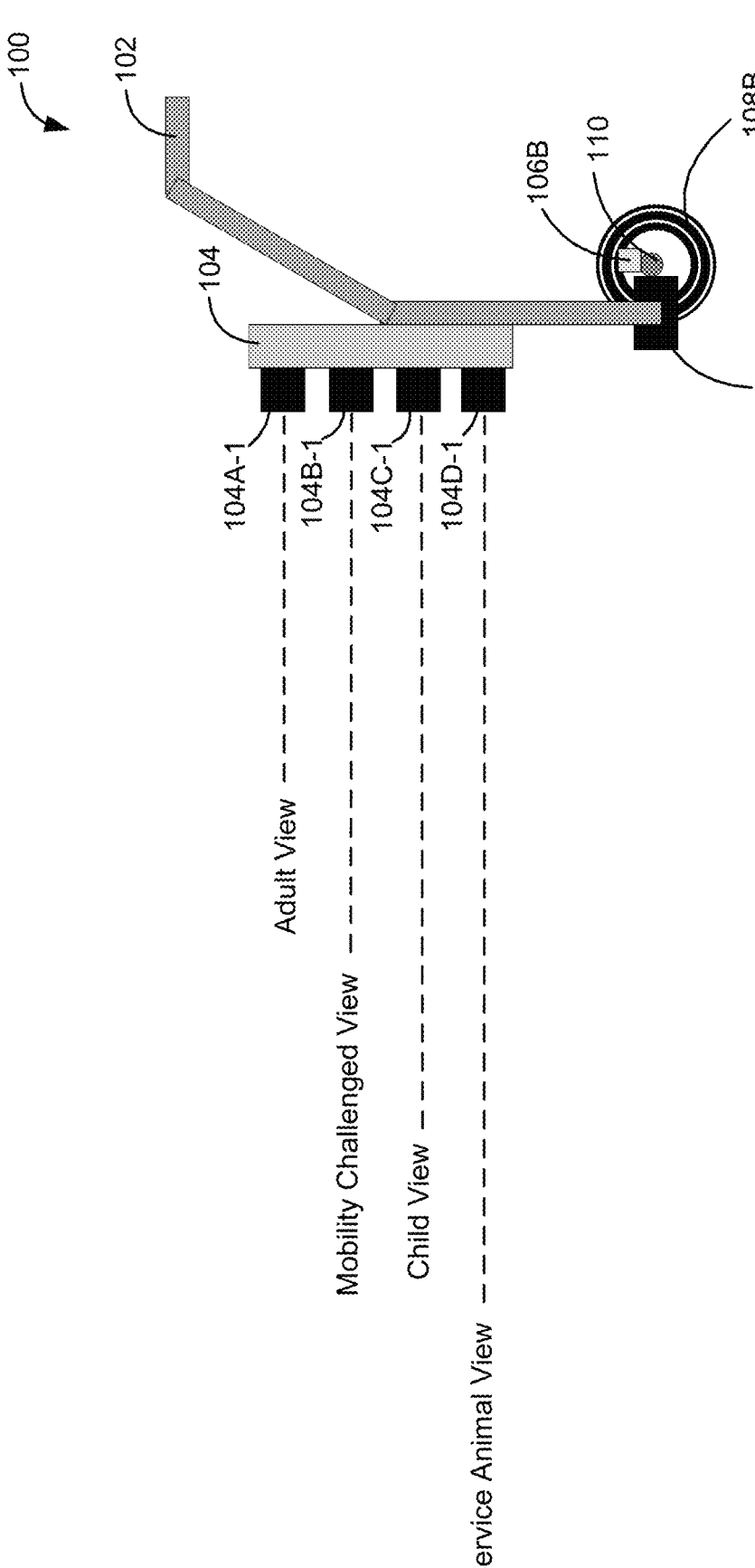
FIG. 2 is another side view of the example scanning tool of FIG. 1A illustrating sensors capturing different perspective views.

FIG. 2 illustrates another side view of example scanning tool 100. As noted above, embodiments of the present disclosure seek to characterize a foot path, e.g., identify foot path surface features, identify obstacles on/along the foot path, etc. Because traditional scanning tools are meant to provide information from devices incapable of detecting characteristics of a pathway as a lower level/height, the characteristics of foot paths and similar pathways, often go unscanned. This can be problematic.

To the above, it has recently suggested that mobility challenges tend to occur at the first and last 30 feet, also referred to as 30 ft micromobility. That is, outside of the first and last 30 feet of a trip/travel presents issues for those with mobility challenges, e.g., due to use of a mobility accessory, height of a person relative to a foot path obstacle, and so on. For example, despite vehicles being equipped with nobility accessories such as chair lifts and ramps, and despite buildings and homes being equipped with mobility accessories, ingress/egress from a vehicle at a garage or driveway can be difficult. The same holds true when entering/exiting a building. At such locations (within the first or last 30 feet), a user may encounter unstable footing, vis-à-vis gravel surfaces, slanted surfaces, stairs/steps, etc. Even in instances where mobility assistance is in the 30 foot micromobility zone is provided, it would be useful to be aware of such provisions.

Thus, in some embodiments, focusing scanning on or in the 30 foot micromobility zone can clarify physical challenges associated with traversing areas that are near-to-vehicle or near-to-structure. The information or data gleaned from such scanning can be used to create maps, such as 3D maps, of such areas or foot paths, enable the quantification of the types/magnitude or mobility challenges, also referred to as a "mobility index."

As illustrated in FIG. 2, a first sensor 104A-1 may be a camera or other sensor (as discussed above) intended to capture, in this example, images of a foot path corresponding to an "adult" view, i.e., generally from the perspective of (at a height commensurate with) an adult person. A second sensor, 104B-1, may be a sensor for gathering data/information that can be scanned by second sensor 104B-1 from a mobility challenged view or perspective. That is, the height at which sensor 104B-1 is disposed on/in attachment structure 104 can be representative of the view a mobility challenged traveler might have or experience. Sitting in a wheelchair, for example, would result in a different perspective or view of a foot path than if the foot path was traversed by an adult. This is because, typically, a person sitting in a wheelchair will be closer to the ground than an adult standing on that same ground. Accordingly, the view of the person sitting in the wheelchair may encompass aspects or characteristics of the foot path that might go unnoticed by a standing adult.

Similarly, a third sensor 104C-1 may be implemented vis-à-vis attachment point 104C to account for the view that may be experienced by a child or youth. Again, given that children are typically shorter in stature than adults or older users, children may benefit from knowledge associated with obstacles or features of a foot path that are present or occur at a level that impacts children (and other users of similar stature or that have a similar view). Still another 30 foot micromobility consideration are service animals. For example, service animals such as dogs have an even shorter/lower level stature that may present issues at certain foot paths. Accordingly, a fourth sensor 104D-1 may be implemented vis-à-vis attachment point 104C to account for the view that may be experienced by a service animal or user of similar stature.

Figure 3B:
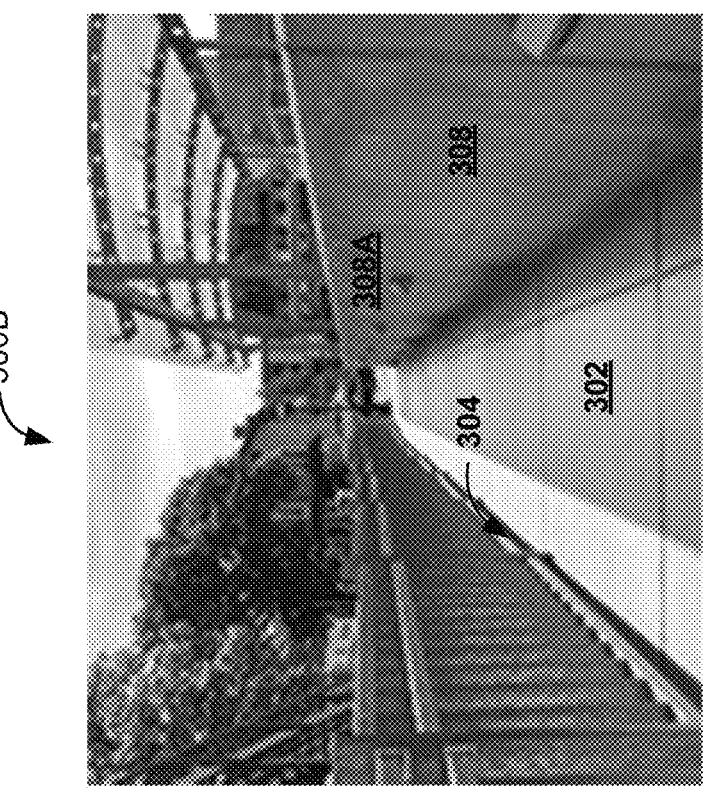
FIG. 3B is a second perspective view of the path of FIG. 3A.
Figure 3A:
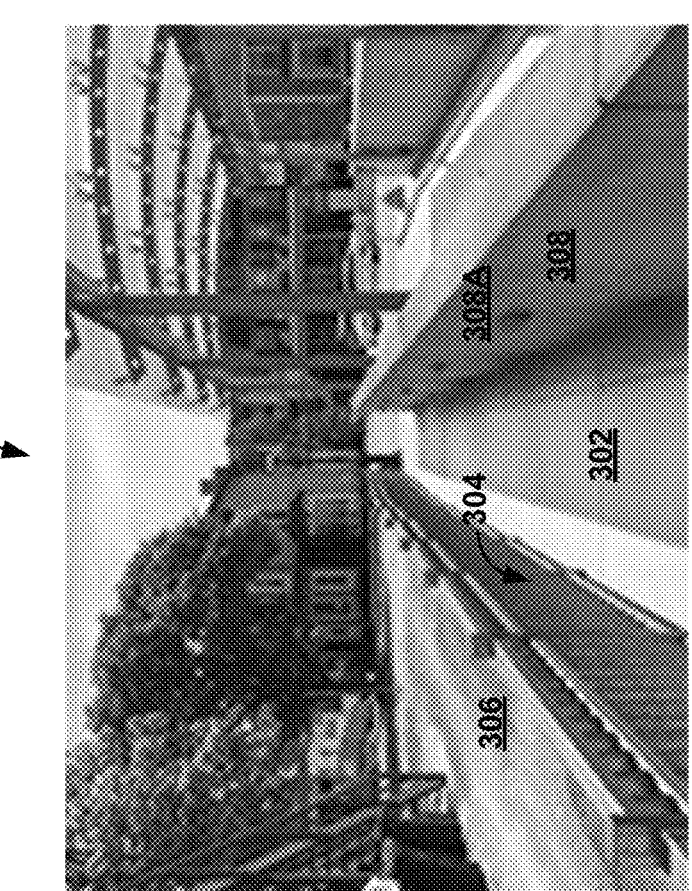
FIG. 3A is a first perspective view of a path.

FIG. 3A illustrates a first perspective view 300A of or associated with a path 302. This first perspective view 300A may be a view from the perspective of a standing adult, for example. That is, referring back to FIG. 2, the adult view sensor 104A-1 may provide such a view/capture information from such a view. FIG. 3B illustrates a second perspective view 300B of or associated with the same path 302. The second perspective view 300B may be a view from the perspective of a shorter person or seated person, e.g., a child or person using a mobility accessory such as a wheelchair. Again referring back to FIG. 2, the child view or mobility challenged sensors 104C-1 and 104B-1, respectively, can provide such views or can capture information or data regarding or present in such views.

It can be appreciated that the first perspective view 300A differs from the second perspective view 300B. For example, the first perspective view 300A includes a view of a neighboring path/roadway 306 that is not seen in the second perspective view 300B. For example, the neighboring path/roadway 306 may be occluded by rail 304 from the second perspective view 300B which may be representative of a child's view. Thus, a person of shorter stature would benefit from the view of a person who is taller. Additionally, in the first perspective view 300A, while railing 304 is visible, the characteristics/details of rail 304 or relative to path 302 cannot or is difficult to ascertain from first perspective view 300A. However, with the second perspective view 300B, one can appreciate that there is a gap or space between the bottom of rail 304 and a top surface of path 302. That is, while the first perspective view 300A is "broader" or encompasses more of a current environment, details of the current environment, at the foot path/lower level, can likely be better appreciated in the second perspective view 300B. For example, it can be appreciated from the second perspective view 300B that a gap between rail 304 and path 302 exists, which may present issues, e.g., a mobility accessory part becoming stuck in the gap. Moreover, the extent to which seams in path 302 impact the path 302 may be better appreciated in the second perspective view 300B. Such seams may impact how easily a mobility accessory may be used to assist in traversing path 302, or how quickly a senior citizen can expect to traverse path 302, etc. As another example, the depth or extent to which a light housing 308A on wall 308 extends into the area of path 302 may not be appreciated by the first perspective view 300A. However, the second perspective view 300B may better reveal the extent to which light housing 308A encroaches into the space defined in part by a path 302. Accordingly, a person using a wheelchair may not appreciate that he/she/it may experience obstacles that can impede or block movement of the wheelchair along path 302 without being privy to the information or data that can be gleaned from the second perspective view 300B. In some instances, a person may not appreciate the height of the top of rail 304 in first perspective view 300A, and thus may erroneously expect to relay on holding onto/using rail 304 while traversing path 302. However, second perspective view 300B may reveal that the height of rail 304 exceeds that which can be relied upon by the user.

Figure 4:
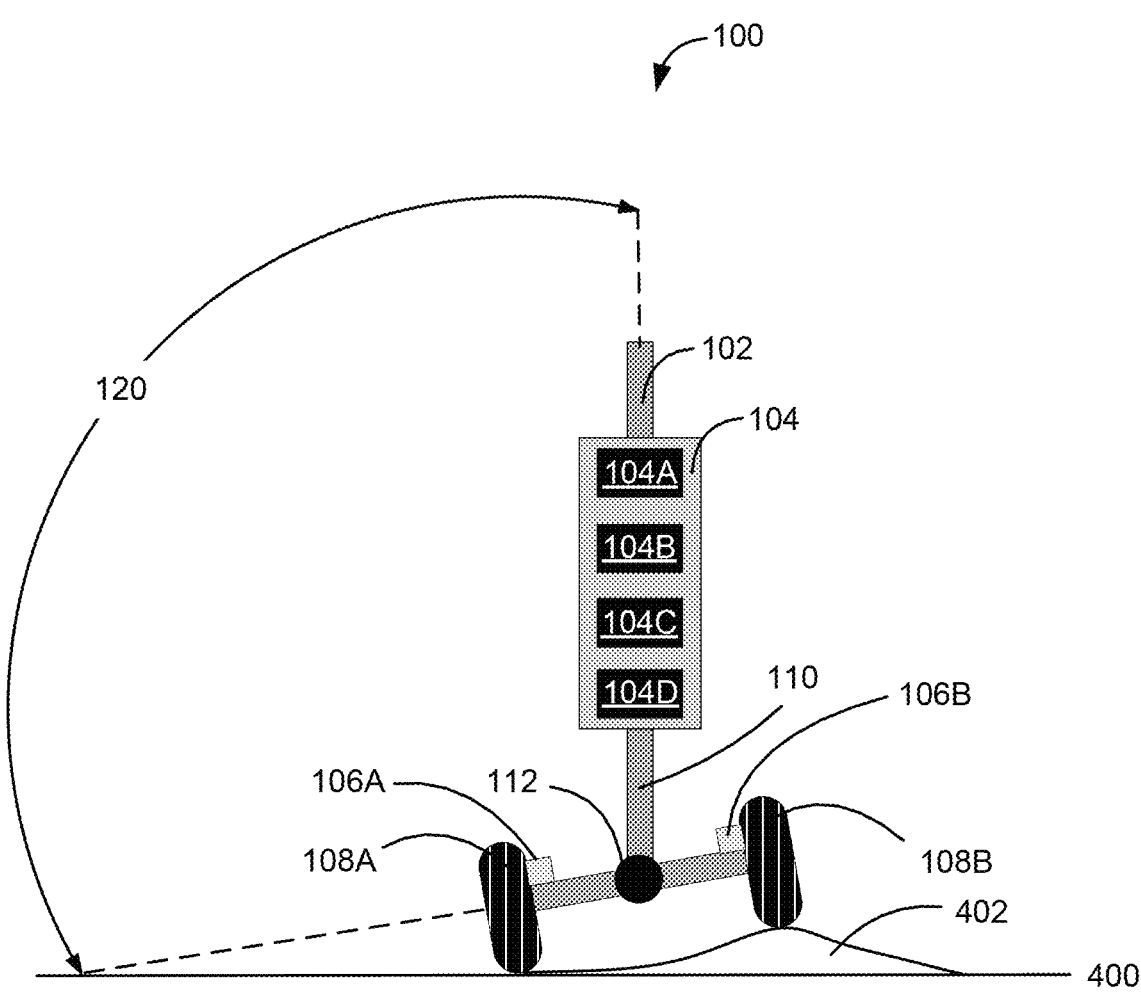
FIG. 4 illustrates an example of angle and torque scanning in accordance with some embodiments.

FIG. 4 illustrates an example scanning scenario that can be accomplished using a contemplated scanning tool, such as scanning tool 100. FIG. 4 illustrates an example frontal view of scanning tool 100. The surface of an example path 400 is illustrated in FIG. 4, where one section of the surface 402 of path 400 is raised. Angle sensor 112 may provide information or data regarding the relative angle between vertical and horizontal structures 102 and 110, respectively, which in turn reflects (or can be used to derive/calculate) the difference between an area of level surface and surface 402 that may be experienced by a person traversing path 400 (in this example, the difference between 90 degrees, the "default" or "original" orientation of vertical structure 102 relative to horizontal structure 110, and the angle measured by angle sensor 112). It should be understood that horizontal structure 110 may be operatively connected to vertical structure 102 at or about at the point at which angle sensor 112 via an appropriate connection mechanism, e.g., pivoting or hinged connection, that allows horizontal structure 110 to move relative to vertical structure 102. In this way, any such movement can represent a measurable angle indicating some characteristic(s) of the surface of a path.

In use, scanning tool 100 may be driven or moved across a path, such as path 400. As scanning tool 100 traverses path 400, information characterizing path 400 can be obtained and stored/transmitted (e.g., to a remote server/processing system) for analysis (to determine notifications, create maps, etc.) applicable to the 30 foot micromobility zone. For example, information regarding deviations from a level surface, such as surface 402, can be mapped based on the information or data gleaned from scanning tool 100. That is, angle sensor 112 may take a plurality of sample angle measurements or readings so that measurements reflecting the extent of surface 402's grade(s) can be captured. The timing of sampling can be defined as needed/desired. For example, scanning tool 100 can be configured to take angle measurements every 5 ms (or other specified interval) so as to obtain enough measurements to characterize surface 402. The measurement interval(s) can differ, for example, depending on how many obstacles or features are assumed to exist along or in a particular path, observed via another mechanism (e.g., gleaned from vehicle-based sensing), where the path resides, what other path(s) the path of interest crosses, etc.). In some embodiments, scanning tool 100 may include a location-based element(s), such as a GPS receiver that can be used to associate obtained measurements with a particular location/area. This can be useful when generating a map of a path, for example. In some embodiments, scanning tool may further include a clock or other timing mechanism to ascertain the time at which a particular area or location is being scanned, or when scanning tool 100 identifies or comes across a feature or characteristic to be measured.

Figure 5A:
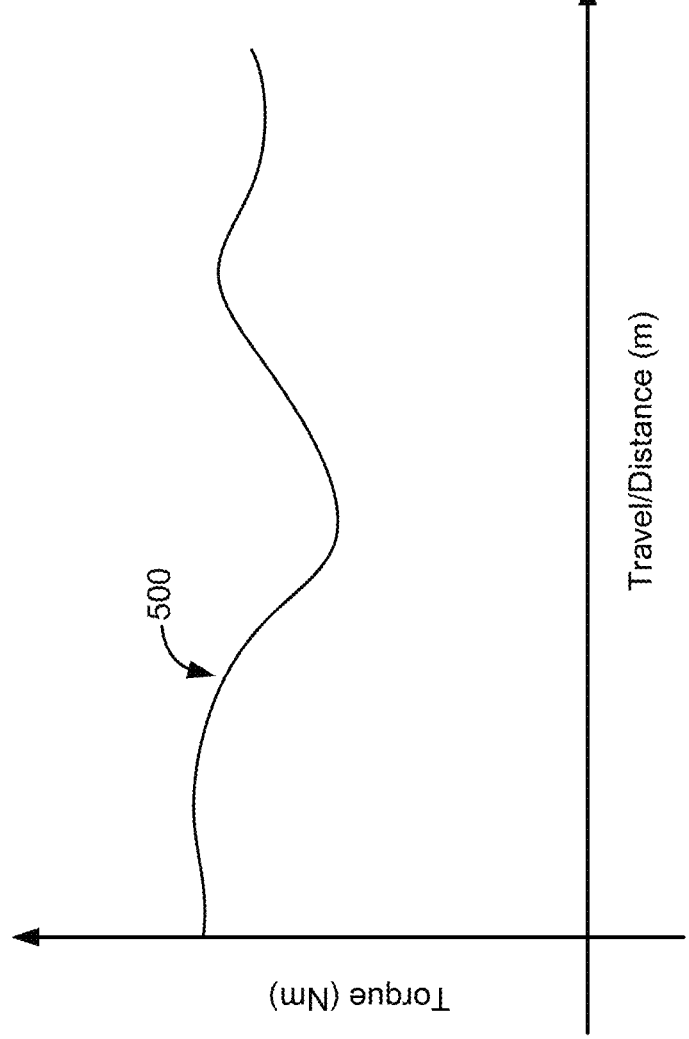
FIG. 5A illustrates an example graph plotting torque as representative of rolling resistance on a path.

FIG. 5A illustrates a graphical representation of example information/data that can be obtained by a scanning tool. Graphical data 500 can represent a plurality of sampled torque data obtained from a scanning tool, such as scanning tool 100, as it traverses a particular foot path. As can be appreciated, as scanning tool 100 traverses a foot path, such as path 400 (FIG. 4), the amount of torque needed by one or more wheels of scanning tool 100 (e.g., wheels 106A, B) to overcome or move over a particular feature, obstacle, etc. can be periodically sampled. Similar to taking angle measurements, some interval, e.g., every 5 ms, can be specified for obtaining torque measurements as well. That is, either one or both of wheel sensors (sensing torque at their respective proximate wheels) can periodically obtain torque measurements experienced while they are in use/scanning tool 100 is being used. The greater the grade/steeper the incline, the more torque may be needed to move over/past a particular obstacle or feature of the path being scanned. The less the grade (or if the incline/grade is a downward incline/grade), the less torque may be needed. Once combined or aggregated, the sampled torque measurements/readings can be plotted, e.g., against distance traveled to achieve graphical data 500 (example units of measurement being, e.g., Newton meters (Nm) for torque and meters (m) for distance of travel). Again, scanning tool 100 may include location-based functionality so that the obtained torque measurements can be associated with particular locations traversed by scanning tool 100. In this way, not only where a feature to be overcome can be determined, but how much torque needed to traverse the feature can be determined as well. It should be noted that in this example, the distance of travel in and of itself may be sufficient information without knowledge of exact location/area to allow a person to traverse a path. It should also be noted that "torque" measured at wheels 106A, B can be translated into a format or type of information/data that can be related to the amount of "work" or force a person or mobility accessory is predicted to expend. Torque as used herein can refer to the rotational resistance experienced by a wheel (e.g., wheel 106A, B) as it traverses a path. On smooth surfaces, the rolling resistance of a wheel, e.g., wheels 106A/B tends to be relatively low, whereas a broken or interrupted surface will result in a wheel encountering more resistance that the wheel must overcome with additional torque.

Figure 5B:
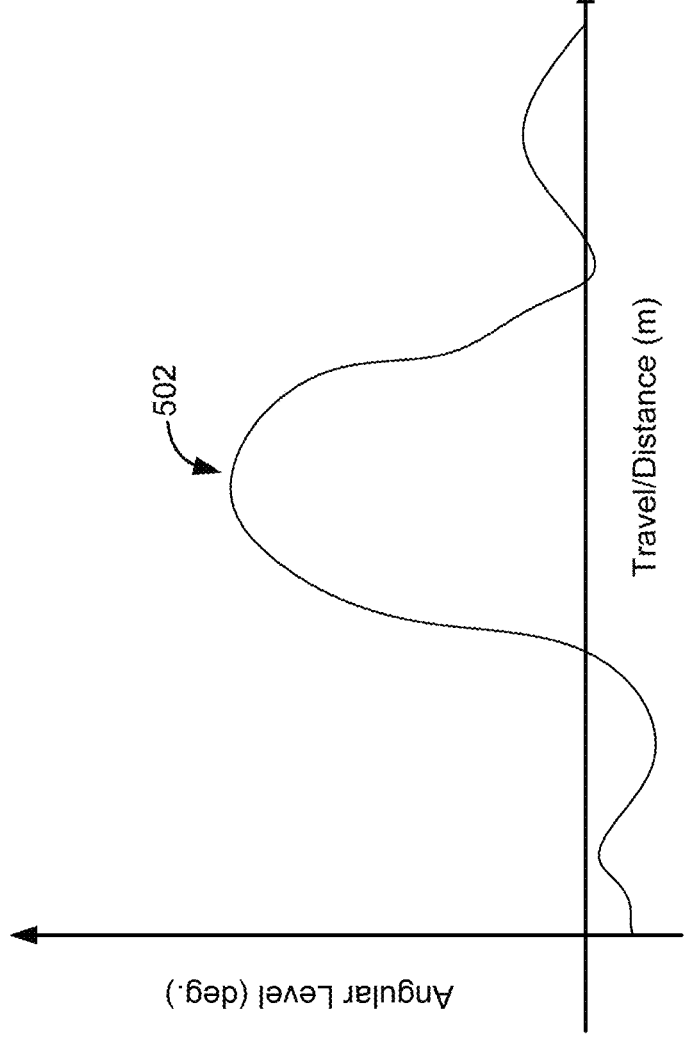
FIG. 5B illustrates an example graph plotting surface level/slope of a path.

FIG. 5B illustrates a graphical representation of example information/data that can be obtained by a scanning tool. Graphical data 502 can represent a plurality of sampled angle data obtained from a scanning tool, such as scanning tool 100, as it traverses a particular foot path. As can be appreciated, as scanning tool 100 traverses a foot path, such as path 400 (FIG. 4), the surface of path 400 may vary (e.g., may have uneven surfaces, may have bumps, potholes, etc.) Similar to taking torque measurements, some interval, e.g., every 5 ms, can be specified for obtaining angular measurements as well. That is, angle sensor 112 can periodically obtain angle measurements experienced while scanning tool 100 is being used. In the example of FIG. 5B, the amplitude of the angular level suggests greater angle disparity relative to a level surface. Once combined or aggregated, the sampled angle measurements/readings can be plotted to achieve graphical data 502. Again, scanning tool 100 may include location-based functionality so that the obtained angle measurements can be associated with particular locations traversed by scanning tool 100. In this way, not only where a feature appears, but how "severe" the angular characteristics of a surface feature (or other feature creating an angular disparity) can be determined as well. It should be noted that in this example, the distance of travel in and of itself may be sufficient information without knowledge of exact location/area to allow a person to traverse a path. It should also be noted that "angle" measured by angle sensor 112 can be translated into a format or type of information/data that can be related how difficult a user may find traversing the path.

Figure 5C:
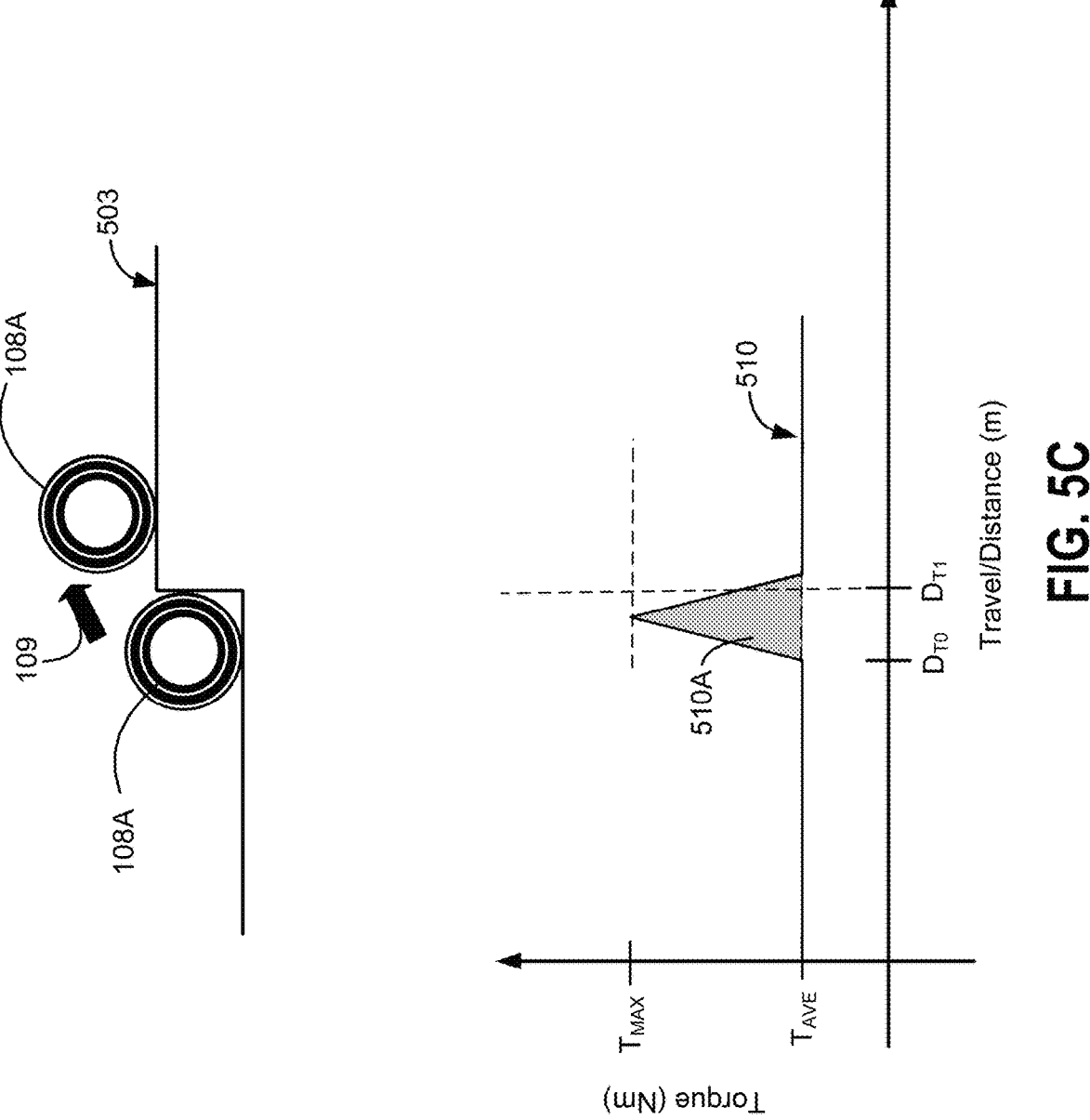
FIG. 5C illustrates an example torque mapping in accordance with one travel scenario.

FIGS. 5C, 5D, 5E, and 5F illustrates certain graphical examples correlating traveled terrain and torque. FIG. 5C illustrates a scenario wherein a wheel, such as wheel 108A (FIGS. 1A/1B) traverses a roadway/walkway section 503, arrow 109 reflecting a direction of travel. As can be appreciated, to traverse section 503, wheel 108A will have to overcome a "step." In the corresponding graph, at a first distance at time $T_0$, it can be appreciated that the amount of torque needed to overcome the height differential from a first (flat) surface of section 503 and the step, increases from what can be referred to as an average torque ($T_{AVE}$) (torque needed for a wheel, such as wheel 108A, for travel on/over/across a flat and smooth surface). It should be understood that the terms "flat" or "smooth" or other characterizations of roadway/walkway surfaces is relative and not necessarily an exact characterization thereof.

Thereafter, the torque needed will, in this example scenario, peak at a maximum torque ($T_{MAX}$). It should be understood that scenarios may necessitate certain amounts of torque for a wheel to traverse some roadway/walkway, and different types of roadway/walkway surfaces may dictate certain torque characteristics. In this scenario, the torque at $T_{MAX}$ is representative of when/where wheel 108A experiences the largest resistance to its traversal over the step. Given physics/momentum/inertia associated with traversing section 503 with wheel 108A, it can be appreciated that the needed torque begins to dissipate even before wheel 108A completely overcomes the step—hence why $T_{MAX}$ occurs prior to $D_{T1}$ (which corresponds to the highest point of the step). The necessary torque then continues to decrease until again reaching $T_{AVE}$ and the secondary flat/smooth area of section 503 (after the step). It should be understood that a first "index" refers to or corresponds to an "integral" of changes in torque from the value of $T_{AVE}$ and is represented by the shaded area(s) 510A. A second index can correspond to $T_{MAX}$, the peak torque value needed to traverse section 503. Other indices can be used/generated which may correspond to, e.g., angular deviation relative to a flat/smooth section, respective peaks/valleys corresponding to physical features of the section being/to be traversed, etc.

Figure 5D:
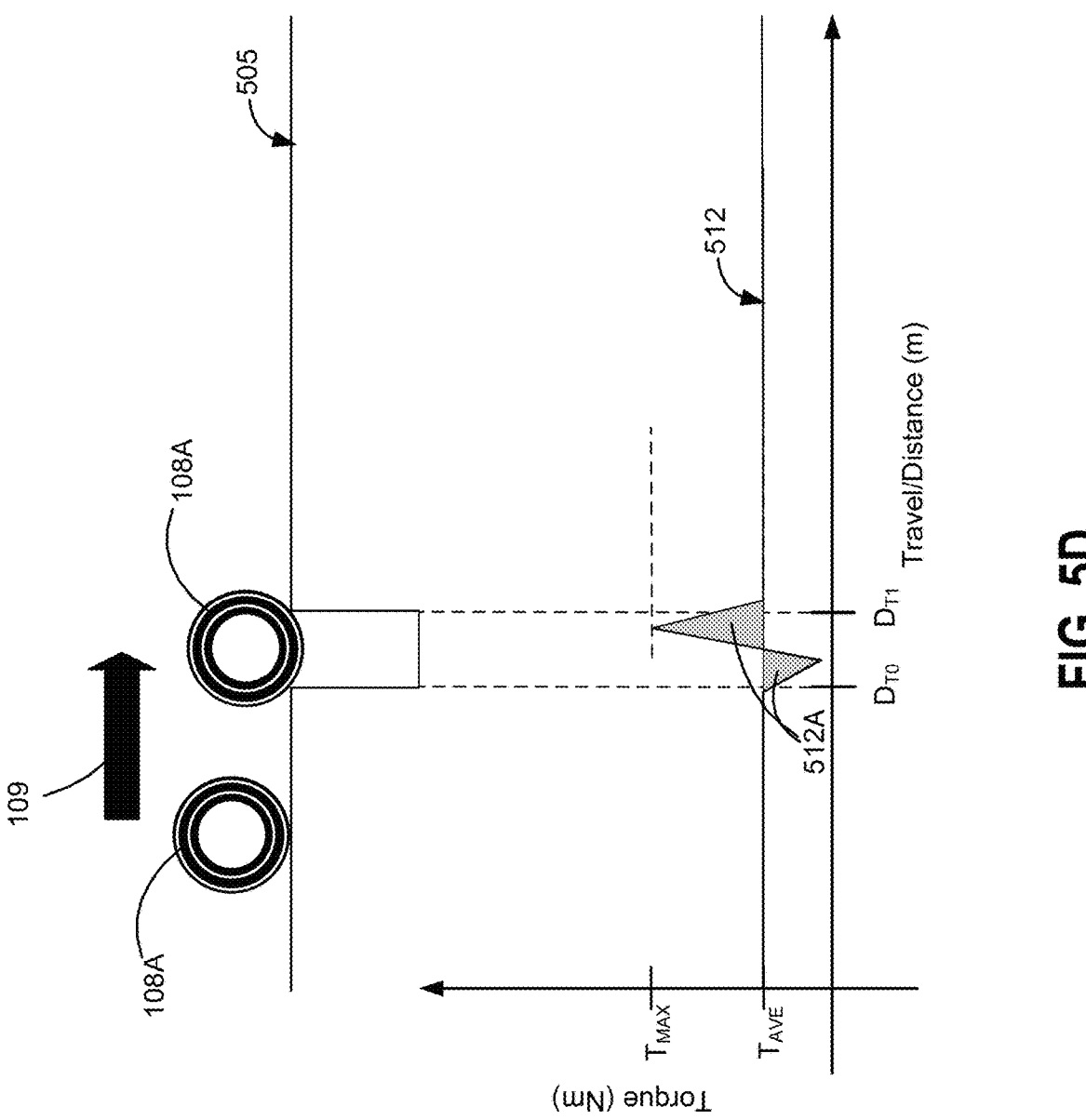
FIG. 5D illustrates an example torque mapping in accordance with one travel scenario.

FIG. 5D illustrates a scenario wherein a wheel, such as wheel 108A (FIGS. 1A/1B) traverses a roadway/walkway section 505. In this example scenario, $T_{AVE}$ once again reflects the torque needed by wheel 108A to traverse the flat/smooth areas of section 505 (the direction of travel represented by arrow 109). Thus, until $D_{T0}$, the amount of torque needed is $T_{AVE}$. In this example scenario, instead of a step, wheel 108A must traverse some gap (or similar feature) of section 505. When wheel 108A dips into the gap, wheel 108A essentially falls into the gap, and therefore, the needed torque falls below $T_{AVE}$ (represented by shaded area 512A). As wheel 108A starts to come out of the gap, similar to the previously-described scenario (FIG. 5C), wheel 108A must overcome a ledge/step of the gap, resulting in an increase in needed torque up to the second index/$T_{MAX}$ (the first index representing the change in torque), and a decrease back to $T_{AVE}$ (the change in torque/first index again being represented by shaded area 512A).

Figure 5E:
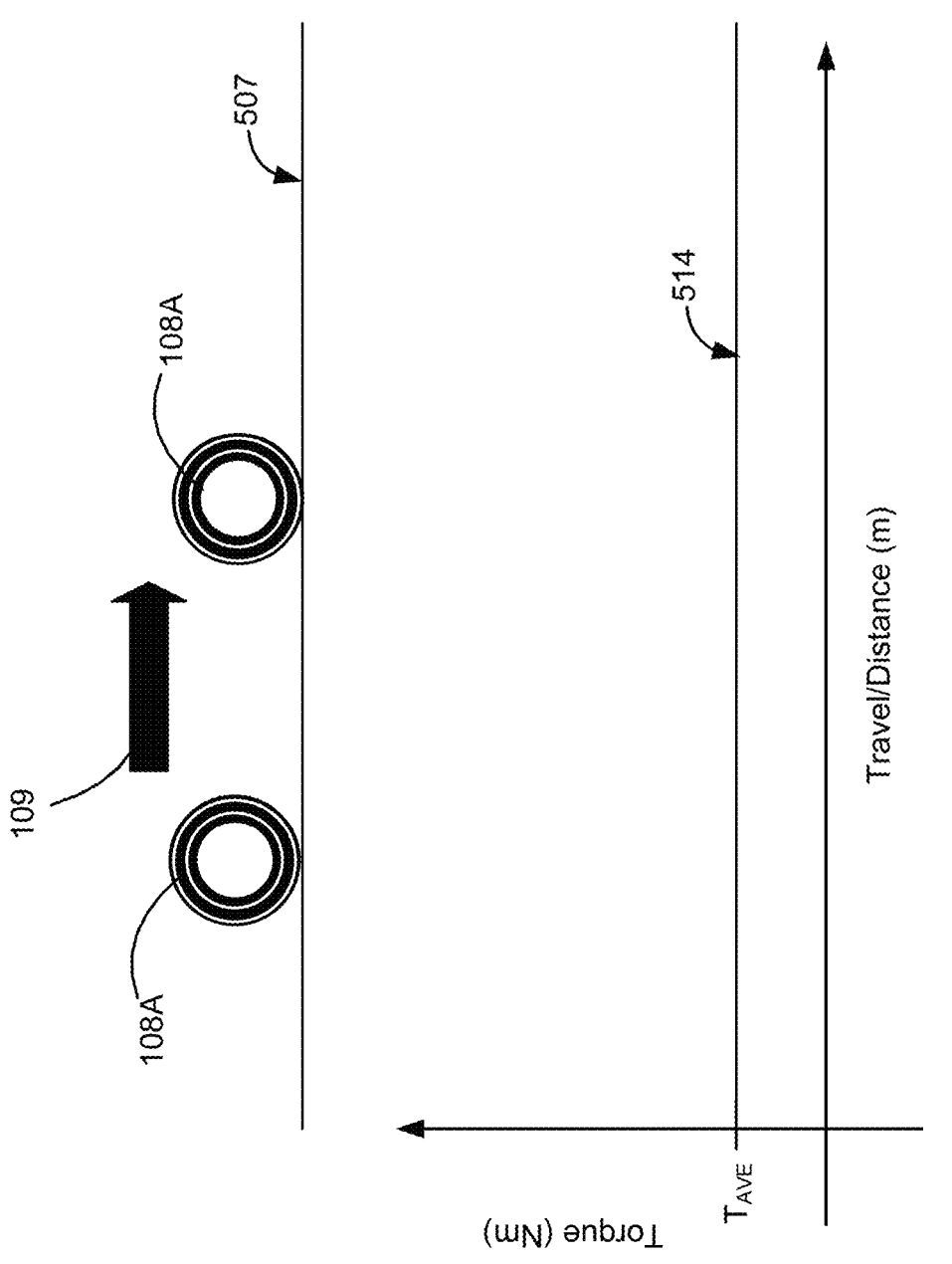
FIG. 5E illustrates an example torque mapping in accordance with one travel scenario.

FIG. 5E illustrates a scenario wherein a wheel, such as wheel 108A (FIGS. 1A/1B) traverses a roadway/walkway section 507. In this example scenario, section 507 is relatively flat/smooth, and thus, wheel 108A (traveling in the direction of arrow 109) will apply average level of torque, $T_{AVE}$, only. Thus, the applied torque 514 remains level throughout the distance/time wheel 108A travels section 507.

Figure 5F:
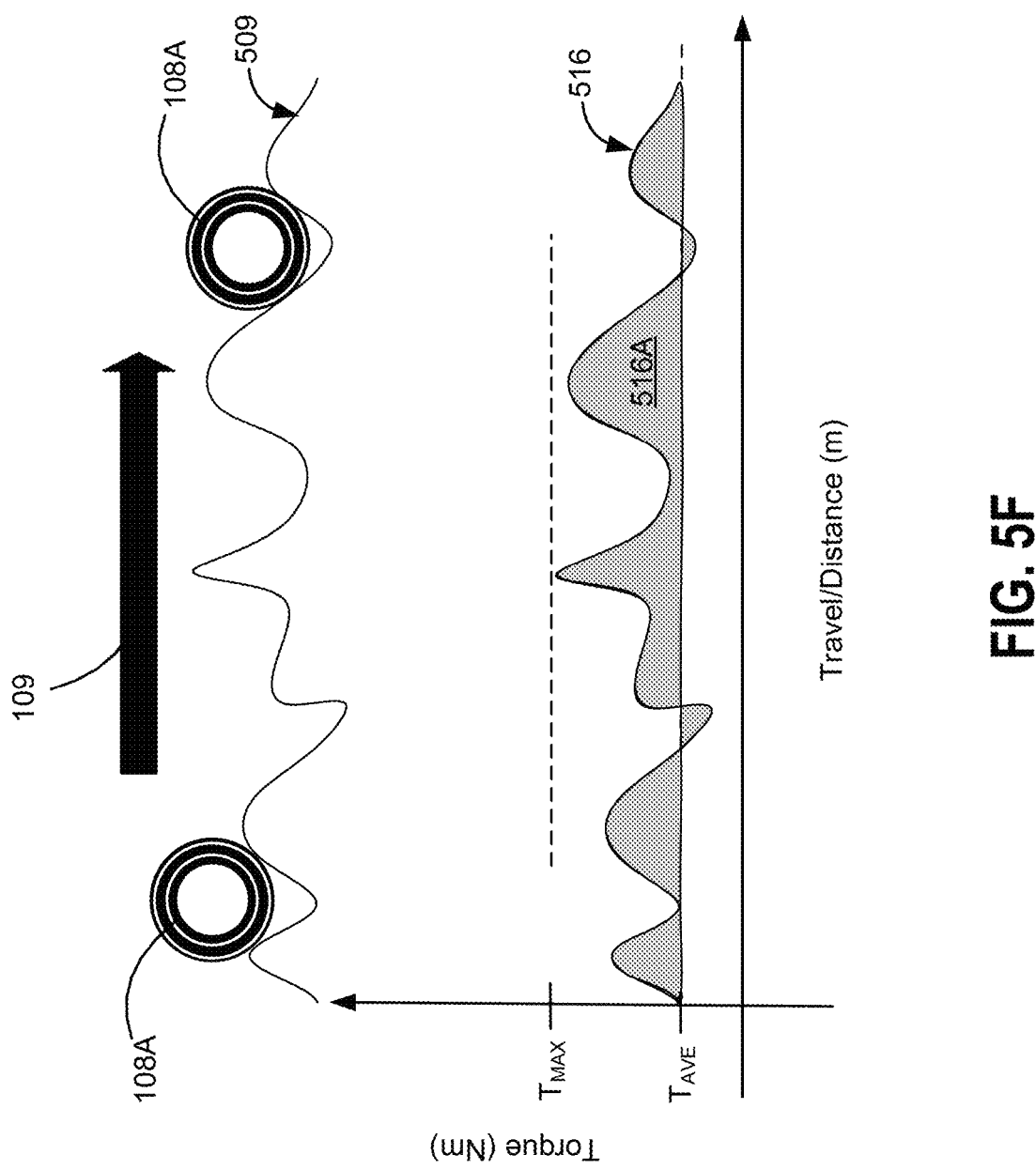
FIG. 5F illustrates an example torque mapping in accordance with one travel scenario.

FIG. 5F illustrates a scenario wherein a wheel, such as wheel 108A (FIGS. 1A/1B) traverses a roadway/walkway section 509. In this example scenario, section 509 is quite varied, and thus, wheel 108A (traveling in the direction of arrow 109) will need varying levels of torque to traverse the peaks and valleys of section 509 (reflected by the graphical representation of necessary torque 516). It can be appreciated that areas (as a function of distance)/times that the needed torque changes (increases/decreases relative to $T_{AVE}$, is reflected by the first index corresponding to shaded area(s) 516A.

Figure 6A:
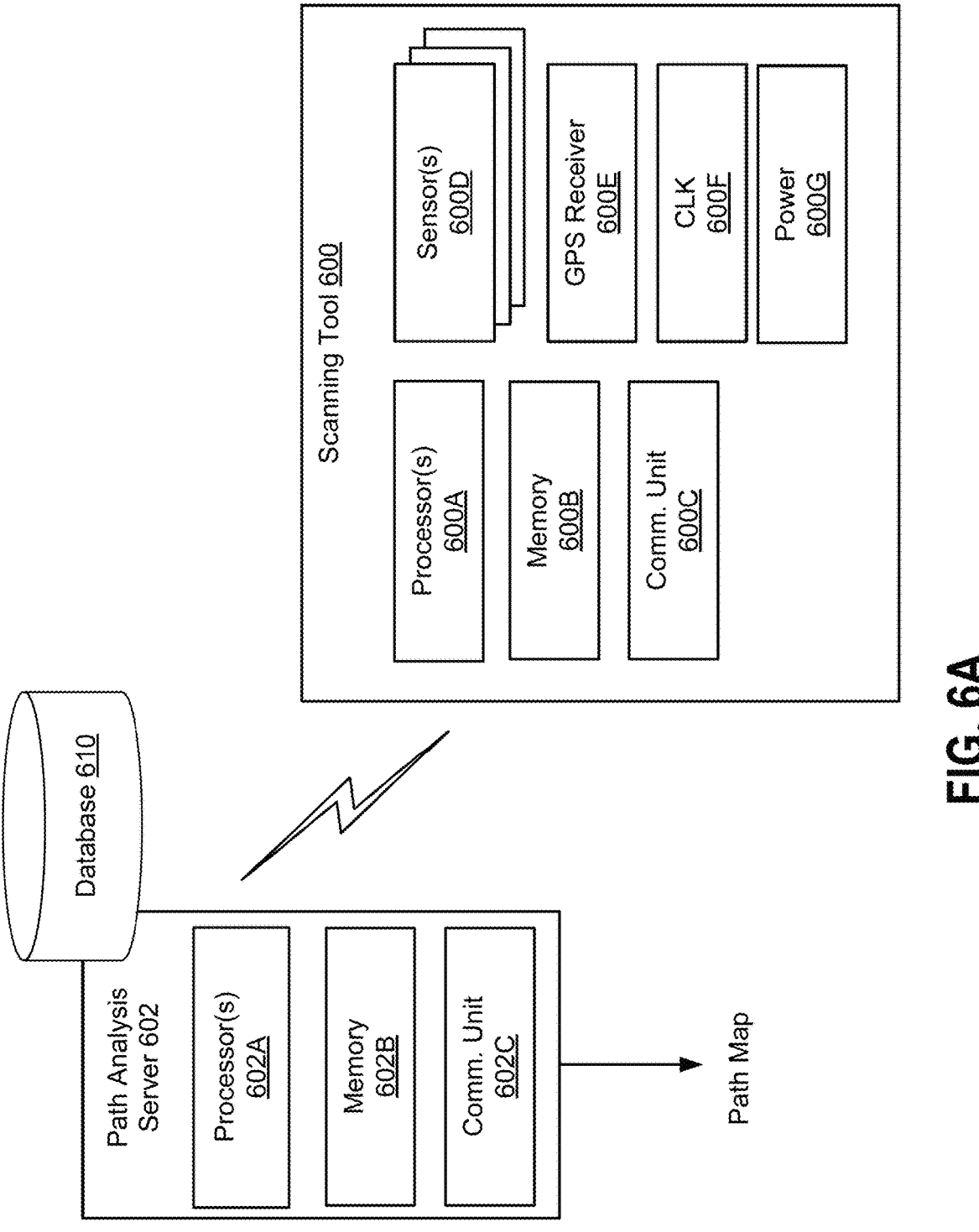
FIG. 6A illustrates an example system architecture for foot path scanning in accordance with some embodiments.

FIG. 6A illustrates an example architecture for detecting challenges or issues associated with traversing paths, such as foot paths, e.g., micromobility challenges, in accordance with one embodiment of the systems and methods described herein. Referring now to FIG. 6A, the example architecture may include scanning tool 600 and a path analysis server 602, which includes or is associated with a database 610.

Scanning tool 600 may be an embodiment of scanning tool 100 (described above), and may include a processor(s) 600A, a memory 600B, a communications unit 600C, one or more sensors 600D, and in some embodiments, a location-based sensor, such as a GPS receiver 600E, or a timer or clock 600F, as well as a power source or power source connector 600G. Sensors 600D may be embodiments of any one or more of sensors 104A-1, B-1, C-1, D-1, 106A, 106B, 112 (or other sensors contemplated by other embodiments).

As previously discussed, scanning tool 600 may be used to obtain information or data characterizing a path being traversed by scanning tool 600. For example, a user may push or otherwise guide/move scanning tool 600 across or over a path. As described above, the one or more sensors may capture, e.g., image or video, or other information/data representative of one or more perspective views of or including the path. For example, some of sensors 600D may capture images of the path, while other sensors may capture grade or slope measurements or other indicia of the characteristics of the path.

In operation, and as explained above, sensors 600D may obtain information/data characterizing a path being scanned. In some embodiments, such information/data may be stored in memory 600B, and communicated, if needed, to path analysis server 602/database 610 via communications units 600C/602C. In some embodiments, processor 600A may receive commands or instructions from memory 600B to begin scanning/measuring a path, stop scanning/measuring a path, etc. based on user input, or automatically upon sensing movement of scanning tool 100, e.g., via one or more of the sensors 600D. As noted above, in some embodiments, raw data or information obtained by one or more of sensors 600D may be processed, e.g., translated or converted, to a useable format. Processor 600A may perform such processing, or such processing may be performed by processor 602A or path analysis server 602 upon receipt from scanning tool 100.

GPS receiver 600E of scanning tool 100 may provide location data that can be associated with obtained measurements/sensor data from one or more sensors 600D. In some embodiments, such location data may be forwarded to path analysis server 602 along with the obtained measurements/sensor data. The same holds true for timing data gleaned vis-à-vis clock 600F. In some embodiments, clock 600F may be a system clock or a clock circuit associated with processor 600A, and time can be associated with the identification of features or characteristics along a path/when features/characteristics are measured or scanned. In some embodiments, block 600F may be synchronized to a clock of path analysis server 602/processor 602A (not shown).

Power source/power source connector 600G may be any type of suitable power source, e.g., battery(ies), or any appropriate power source connection mechanism to operatively connect scanning tool 600 to a power source enabling its operation. For example, power source 600G can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply. It should be understood that the functionality regarding image processing, the creation of maps, etc., i.e., operations that can be performed post-information or data capture by one or more sensors 600D, can be performed either by processor 600A of scanning tool 600 or by processor 602A of path analysis server 602 depending on the needed processing capability or power.

It should be noted that any data or information received and stored in database 610 can be maintained for later/subsequent use, for sharing with other parties, etc. In some embodiments, to save processing power, reduce time needed to create maps, define characteristics of a path, etc., newly captured data received by path analysis server 602 can compare such newly captured data with already-stored data. Only data that has changed pursuant to the newly captured data may be updated. In this way, data that remains valid/relevant need not be updated, and the processing of data, creation of maps, etc. can progress without re-processing existing data if not needed.

Processors 600/602 can include a GPU, CPU, microprocessor, or any other suitable processing system. Memory 600B, 602B and database 610 may include one or more various forms of memory or data storage (e.g., flash, RAM, etc.) that may be used to store images (analysis or historic), parameters, instructions and variables for processors 600/602 as well as any other suitable information. Memory 208, can be made up of one or more modules of one or more different types of memory, and may be configured to store data and other information as well as operational instructions that may be used by the processors 600/602 to facilitate the capturing of information/data characterizing a path and processing the captured information/data in various ways create maps, provide insight regarding path traversal, quantify characteristics, etc.

Although the example of FIG. 6A is illustrated using processor and memory circuitry, as described below with reference to circuits disclosed herein, scanning tool 100, and path analysis server 602 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up the processing/analysis aspect of scanning tool 100 and path analysis server 602.

Communications components 600C/602C may include a transceiver coupled with an antenna for wireless communications with sensors 600D or path analysis server 602/scanning tool 100. Communications components 600C/602C may also or alternatively include a wired input/output (I/O) interface for wired communications with sensors 600D or path analysis server 602/scanning tool 100.

The aforementioned transceiver can include a transmitter and a receiver to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. The above-noted antenna may be coupled to the wireless transceiver and used by the wireless transceiver to transmit radio signals wirelessly to wireless equipment with which it is connected and to receive radio signals as well. These RF signals can include information of almost any sort that is sent or received by the components/elements of scanning tool 600 or path analysis server 602.

The wired I/O interface can include a transmitter and a receiver for hardwired communications with other devices. For example, the wired I/O interface can provide a hardwired interface to other components, including sensors 600D and scanning tool 600/parth analysis server 602. The wired I/O interface can communicate with other devices using Ethernet or any of a number of other wired communication protocols whether standardized, proprietary, open, point-to-point, networked or otherwise.

Figure 6B:
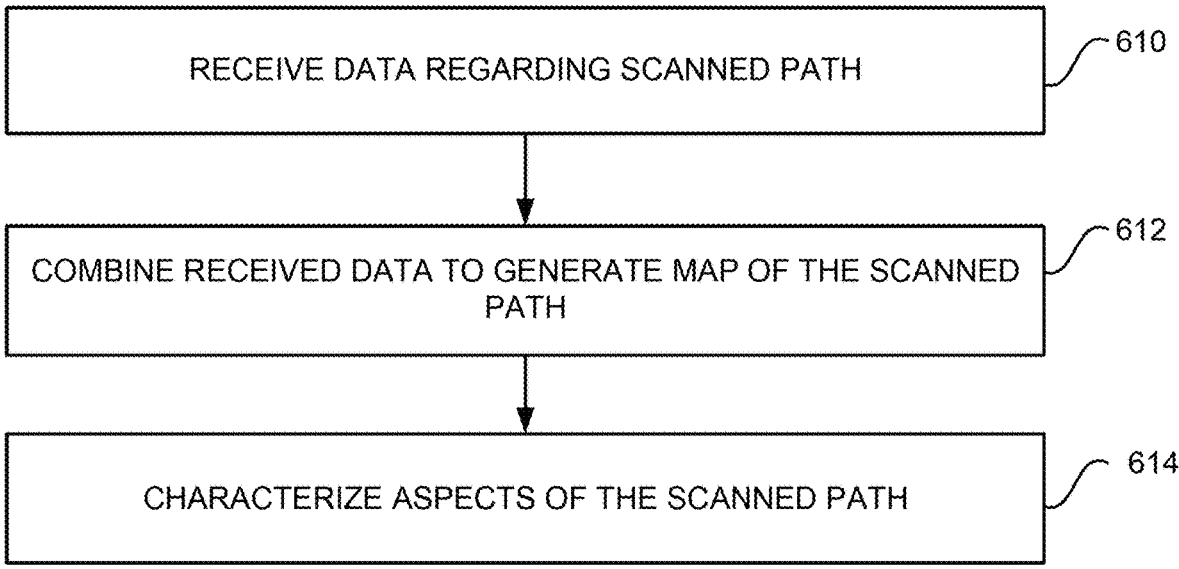
FIG. 6B illustrates example operations that may be performed for foot path scanning in accordance with some embodiments.

FIG. 6B is a flow chart illustrating example operations that may be performed to characterize a path using a scanning tool, such as scanning tool 100 (FIG. 1) that can be used to obtain measurements or other data/information characterizing a path. At operation 601, data regarding a scanned path is received. As described above, scanning tool 100 may be used to traverse a path or portion(s) of a path so that information characterizing that path can be obtained. Scanning tool 100 may use sensors to gather images, record information, and the like. Scanning tool 100 may also use sensors to characterize the surface(s) of a path, for example, any slopes, holes, or other irregularities (or lack thereof). As also described above, scanning tool 100 may capture images or record information from a variety of viewing perspectives that may generally correspond to users/persons that may traverse the path. Some users may be standing, while others may be sitting. Some users may be adults, while others are children. Ultimately, images corresponding to some number of desired views can be captured using, e.g., sensors operating at different heights/locations relative to one another or the surface of the path. For example, one sensor of scanning tool 100 may be positioned on scanning tool 100 such that it records images commensurate with the stature of a standing adult, while another sensor of scanning tool 100 may be positioned on scanning tool 100 at a lower height commensurate with the stature of an adult in a mobility accessory, e.g., wheelchair.

In addition to capturing images and recording information as described above, scanning tool 100 may comprise additional sensors or mechanisms for measuring other features or aspects of a path. For example, scanning tool 100 may include a sensor for measuring the angle(s) associated with the surface(s) of the path. That is, if scanning tool 100 is made to traverse a section of a path with a raised hump, scanning tool 100 by virtue of recording angular information associated with the raised hump can provide information regarding when/where the path is level and when/where it is not level.

Further in addition to capturing images and recording information as described above, scanning tool 100 may further comprise additional sensors or mechanisms for measuring the torque needed for one or more wheels of scanning tool 100 to overcome or roll over a particular obstacle or feature of or in the path being scanned. The amount of torque recorded relative to the amount of resistance a wheel experiences as it traverses path can be indicative of, and may thus be used to characterize the amount of effort one traversing the path may have to exert.

At operation 612, the received data may be combined to generate a map of the scanned path. It should be understood that a map can refer to a graphical representation of an area, in this case, a path. The map can be visual in nature, such as typical map. However, a map can also refer to a characterization, in any form, of the aspects/features/elements/etc. of a path. For example, a textual description of the path may still comprise a map. Combining the received data may include combining two or more captured images or visual representation of the path/sections of the path. Again, the captured images may be images of the same path taken from different perspectives, e.g., heights relative to the scanning tool 100 or the ground/surface of the path, or other reference point(s) or area(s). In this way, a "complete" or complete-as-possible view of the path can be generated. That is, the view from the perspective of a standing adult can be combined with the view from the perspective of a sitting adult, with the view from the perspective of a child, and so on. Features or aspects of the path/surrounding area(s) missing or occluded from one view may be seen/captured in another view. Moreover, data or information regarding grade/slope (by way of an angle sensor, for example) as well as resistance (by way of a torque sensor(s), for example,) can also be combined with the image/visual representations to again, provide as complete or fulsome characterization of a path as possible.

Regarding the combination of images or similar data, common or overlapping features/aspects/pixels of images can be used as reference points for combining images, such that the perspective views obtained by scanning tool 100 can be stitched together to form a "complete" view of the path. Those of ordinary skill in the art will understand how image stitching can be accomplished. The angular and resistance-based information or data can be combined with the image data where appropriate as well such that areas where angular and resistance-based information or data is obtained can be reflected in the map. In some embodiments, one or more of location and time-based data or information can be combined with or appended to/included with the captured information.

At operation 614, aspects of the scanned path can be characterized. At this stage, characterization can refer to quantifying or assigning values to such aspects of the scanned path. For example, and as alluded to above, an index value may be assigned to each feature or aspect of the scanned path, such as raised surfaces, holes, or other surface anomalies, level surfaces/areas, and so on. The amount of torque needed to overcome some obstacle or feature as well as the corresponding angular information can also be the basis for assigning index values, e.g., the higher the angle of deviation from zero (or level), the higher the index value, which ultimately indicates a need for higher or more energy expenditure to traverse a path or section(s) of a path. It should be understood that various methods of characterizing aspects of the scanned path can be used. For example, the scale or range of index values and the manner in which index values may be assigned can vary depending on the needs/desires associated with the scanning of the path, the aspects/features thereof, and so on. Different rankings/weights can be included when determining index values as well. For example, paths with more obstacles to contend with when traversing may be weighted more heavily than other, less-populated paths to characterize the path to a user. Ultimately, the characterized aspects of the scanned path can be presented to users, used as a basis for reporting/notifying users or entities that have an interest in such characterizations, e.g., users or entities that plan renovations, improvements, insurance carriers, city planning, and so on.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/ functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up system 500 and its component parts, infrastructure analysis component 508, ECUs 502A and 504A of vehicles 502 and 504, respectively, etc. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An apparatus, comprising:
a mobility mechanism operatively connected to a frame;
a first set of sensors mounted to the frame capturing different perspective views of a scene including a pathway, the sensors adapted to capture viewpoints for persons traversing the pathway; and
a second set of sensors operatively connected to the frame capturing physical measurements characterizing the pathway based on the mobility mechanism traversing the pathway, wherein the first set of sensors and the second set of sensors are actively controlled to capture data only during a first distance interval at a start of the pathway and a second distance interval at an end of the pathway, wherein the first distance interval is bounded based on determining that the second set of sensors have started moving, and wherein the second distance interval is bounded based on determining that the second set of sensors have stopped moving.

2. The apparatus of claim 1, wherein the first set of sensors comprises imaging sensors.

3. The apparatus of claim 1, wherein the frame comprises a vertical structure and a horizontal structure moveably connected to the vertical structure.

4. The apparatus of claim 3, wherein the first set of sensors are operatively connected to the vertical structure at different heights along the vertical structure.

5. The apparatus of claim 3, wherein the second set of sensors are operatively connected to the horizontal structure.

6. The apparatus of claim 5, wherein a first sensor of the second set of sensors comprises an angle sensor adapted to measure an angle of deviation from a level surface of the pathway.

7. The apparatus of claim 6, wherein the angle sensor is disposed approximately at a point where the vertical structure and the horizontal structure are moveably connected.

8. The apparatus of claim 5, wherein second and third sensors of the second set of sensors comprises torque sensors further operatively connected to the mobility mechanism.

9. The apparatus of claim 8, wherein the torque sensors measure resistance experienced by the mobility mechanism when traversing the pathway.

10. The apparatus of claim 1, further comprising a communications unit through which the perspective views and the physical measurements are transmitted to a remote path analysis server generating a map of the pathway by combining the perspective views and the physical measurements.

11. The apparatus of claim 1, wherein the second set of sensors is actively controlled to not capture data during a section of the pathway located in between the first distance interval and the second distance interval.

12. A method, comprising:
receiving data regarding a scanned path from a set of one or more sensors capturing physical measurements characterizing a pathway by traversing the scanned path with the set of one or more sensors, the sensors adapted to capture viewpoints for persons traversing the pathway, wherein the set of one or more sensors is actively controlled to capture data only during a first distance interval at a start of the pathway and a second distance interval at an end of the pathway, wherein the first distance interval is bounded based on determining that the set of one or more sensors have started moving, and wherein the second distance interval is bounded based on determining that the set of one or more sensors have stopped moving;
combining the received data to generate a map of the scanned path; and
characterizing aspects of the scanned path based on the combined received data.

13. The method of claim 12, wherein receiving the data regarding the scanned path comprises receiving sensor data from a first set of sensors disposed on a scanning tool, each of the first set of sensors comprising imaging devices disposed at varying heights along the scanning tool.

14. The method of claim 13, wherein receiving the data regarding the scanned path comprises receiving sensor data from a second set of sensors disposed on the scanning tool, the second set of sensors comprising an angle sensor and a torque sensor.

15. The method of claim 14, further comprising determining at least one of a time and location associated with the received data.

16. The method of claim 14, wherein characterizing aspects of the scanned path comprises assigning a value quantifying the aspects of the scanned path based on physical features of the scanned path.

17. The method of claim 14, wherein characterizing aspects of the scanned path comprises assigning a value quantifying the aspects of the scanned path based on an amount of torque needed to overcome a physical feature of the scanned path.

18. The method of claim 14, wherein characterizing aspects of the scanned path comprises assigning a value quantifying the aspects of the scanned path based on an angle of deviation of a physical feature of the scanned path relative to a level section of the scanned path.

19. The method of claim 12, wherein the set of one or more sensors is actively controlled to not capture data during a section of the pathway located in between the first distance interval and the second distance interval.

\* \* \* \* \*